(12) United States Patent
Eckerley et al.

(10) Patent No.: US 11,117,605 B2
(45) Date of Patent: Sep. 14, 2021

(54) CARGO DOLLY WITH SYNCHRONOUS STEERING AND ACCESSIBLE SURFACE CASTORS AND METHOD OF MANUFACTURE

(71) Applicant: Par-Kan Company, LLC, Silver Lake, IN (US)

(72) Inventors: Brent Eckerley, Silver Lake, IN (US); George Donald Thomas Shoebridge, Silver Lake, IN (US); Elizabeth Claire Vinson, Silver Lake, IN (US)

(73) Assignee: Par-Kan Company, LLC, Silver Lake, IN (US)

( * ) Notice: Subject to any disclaimer, the term of this patent is extended or adjusted under 35 U.S.C. 154(b) by 0 days.

(21) Appl. No.: 16/587,477

(22) Filed: Sep. 30, 2019

(65) Prior Publication Data

US 2020/0101994 A1 Apr. 2, 2020

Related U.S. Application Data

(60) Provisional application No. 62/739,319, filed on Sep. 30, 2018.

(51) Int. Cl.
*B62B 3/02* (2006.01)
*B62B 5/00* (2006.01)
*B62B 3/00* (2006.01)

(52) U.S. Cl.
CPC ............... *B62B 3/02* (2013.01); *B62B 3/001* (2013.01); *B62B 5/0079* (2013.01); *B62B 2301/04* (2013.01)

(58) Field of Classification Search
CPC ......... B62B 3/02; B62B 3/001; B62B 5/0079; B62B 2301/04; B62B 2301/044; B62B 2301/06

USPC ..................................................... 280/79.11
See application file for complete search history.

(56) References Cited

U.S. PATENT DOCUMENTS

| 3,197,230 A | 7/1965 | Raimbault | |
| 5,199,729 A * | 4/1993 | Sievert | B62B 5/0013 108/15 |
| 5,749,589 A * | 5/1998 | Hopkins | B62B 3/001 280/47.34 |

(Continued)

OTHER PUBLICATIONS

International Search Report and Written Opinion regarding PCT/US2019/053771, dated Dec. 4, 2019.

*Primary Examiner* — John D Walters
(74) *Attorney, Agent, or Firm* — Polsinelli PC; Adam C. Rehm

(57) ABSTRACT

A transportation dolly can have a frame, two axles pivotally coupled with the frame, each axle having two distal ends and a wheel assembly coupled at each distal end and a synchronous steering system. The synchronous steering system can include an intermediate link pivotally coupled with the frame, the intermediate link having a two distal ends, and a first push-pull rod coupling one of the two axles with the intermediate link, and a second push-pull rod coupling the other of the two axles with the intermediate link. The first push-pull rod is coupled to one distal end of the intermediate link and the second push-pull rod is coupled to the opposing distal end of the intermediate link. The first push-pull rod, the second push-pull rod, and the intermediate link provide counter phase synchronous pivoting of the two axles relative to the transportation dolly.

20 Claims, 7 Drawing Sheets

(56) References Cited

U.S. PATENT DOCUMENTS

| | | | |
|---|---|---|---|
| 5,873,592 A | 2/1999 | Daenens | |
| 6,554,298 B1 * | 4/2003 | Bidwell | B62B 3/001 |
| | | | 280/47.11 |
| 6,619,680 B2 * | 9/2003 | Platteeuw | B62D 13/04 |
| | | | 280/100 |
| 7,571,916 B2 * | 8/2009 | Skiles | B62D 13/02 |
| | | | 180/24.01 |
| 8,430,412 B2 * | 4/2013 | Sanvido | B62B 3/001 |
| | | | 280/47.11 |
| 8,851,488 B2 * | 10/2014 | Carruyo | B62D 25/2054 |
| | | | 280/79.11 |
| 9,694,838 B2 * | 7/2017 | Gullino | B62D 7/026 |
| 2002/0125666 A1 | 9/2002 | Bidwell | |
| 2014/0300070 A1 | 10/2014 | Veronie | |

* cited by examiner

CARGO DOLLY WITH SYNCHRONOUS STEERING AND ACCESSIBLE SURFACE CASTORS AND METHOD OF MANUFACTURE

CROSS-REFERENCE TO RELATED APPLICATION

This application claims the benefit of U.S. Provisional Application No. 62/739,319, filed Sep. 30, 2018, the contents of which is incorporated by reference herein in its entirety.

FIELD

The present technology is directed to a dolly having synchronous steering and/or accessible surface castors. In particular, the present technology involves one or more linkable cargo dollies having adjustable synchronous steering and/or accessible surface castors and method of manufacturing the one or more linkable cargo dollies.

BACKGROUND

Cargo transportation for large and/or bulky items often requires utilization of a cargo dolly. Cargo dollies can require manipulation in tight spaces and/or multiple cargo dollies can be linked one to the other forming a train, thus necessitating a tighter turning radius. As cargo dolly trains can vary in length and/or arrangement, the turning radius of each cargo dolly may need to be adjusted in view of the cargo train.

BRIEF DESCRIPTION OF THE DRAWINGS

The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
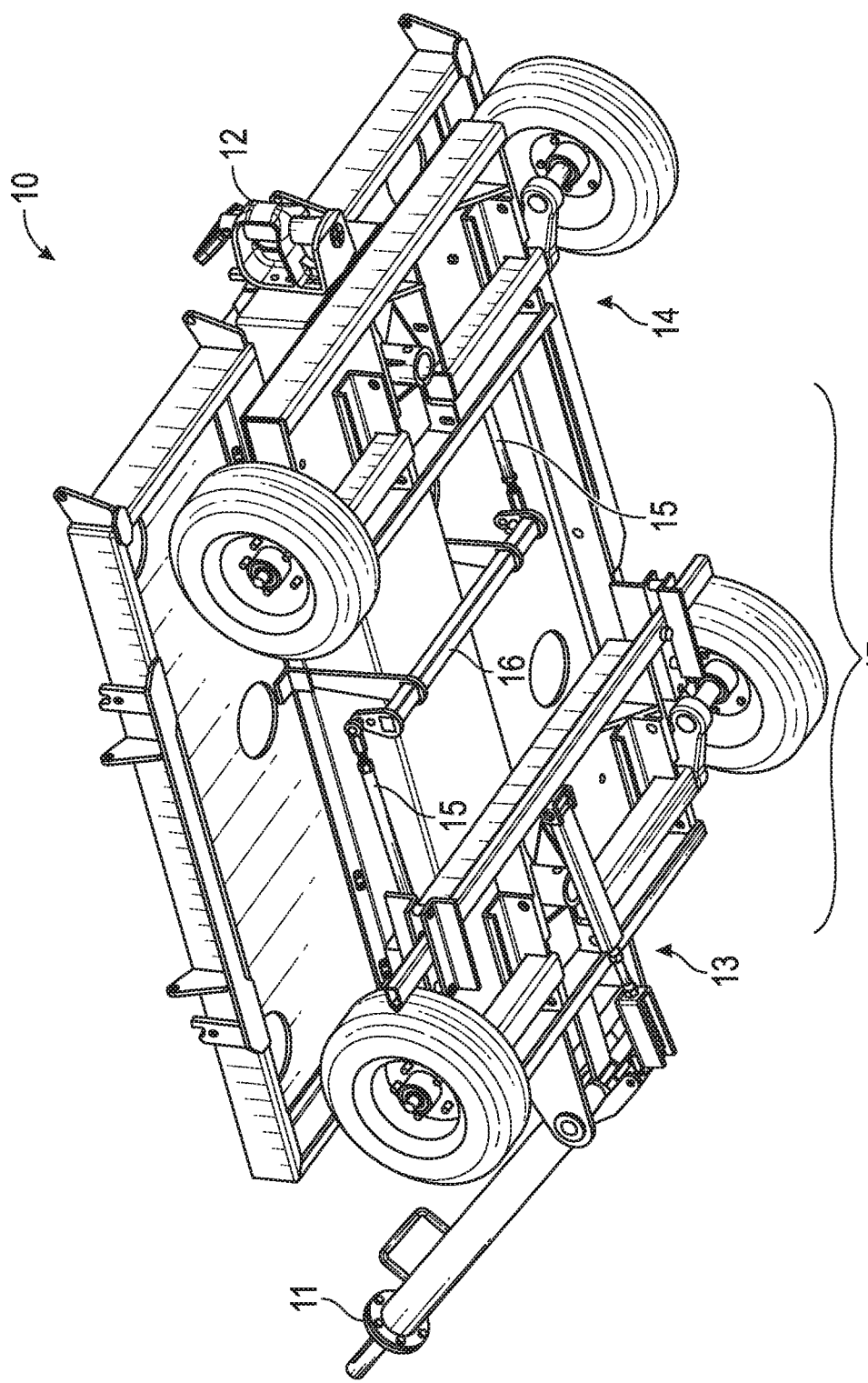
FIG. 1 is a bottom isometric view of a cargo dolly according to at least one example of the present disclosure.

Various embodiments of the disclosure are discussed in details below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The term "cargo dolly" is used herein and refers to a vehicle, wagon, train, trolly, cart, and/or any other moveable platform for use in transporting cargo or cargo containers from one location another.

The present disclosure is drawn to a cargo dolly, or vehicle, having synchronous steering linked between a front axle and a rear axle. The front axle and the rear axle can be linked by one or more push-pull rods and/or a pivotal intermediate link. The intermediate link can be pivotally coupled with the cargo dolly causing counter phase synchronous steering between the front axle and the rear axle. The intermediate link can further include a plurality of apertures for coupling the respective push-pull rods of the front and/or rear axle. The plurality of holes can provide adjustable connections between the one or more push-pull rods and the intermediate link, thus providing differing proportions of steering for the cargo dolly. The adjustable proportions of steering can insure additional linked carts and/or cargo dollies track with the same footprint and/or path of the preceding cargo dolly.

Each cargo dolly as described herein can include a tow bar, tongue, and/or hitch on each of the front and/or rear of the dolly. The tow bar, tongue, and/or hitch assemblies on the front and/or rear of the dolly can allow any number of dollies to be linked one to the other and/or coupled with a tow vehicle. The tow bar, tongue, and/or hitch assembly on the front and/or rear of the dolly can also allow coupling of an integrated expansion piece without requiring an additional cargo dolly to be added, specifically for larger cargo.

Further, each of the front and/or rear axles of the cargo dolly can include one or more wheel assemblies. In at least one example, each cargo dolly has a single wheel assembly disposed on each distal end of the front and/or rear axle assembly. In other examples, the cargo dolly can have a dual wheel assembly (e.g. dually) disposed on each distal end of the front and/or rear axle assembly.

The cargo dolly can further include a plurality of castors recessed and coupled with an upper surface. The plurality of castors can be substantially recessed to provide a rolling upper surface on the cargo dolly allowing cargo placed thereon to be easily added, positioned, and/or removed therefrom. The plurality of castors can be coupled with the cargo dolly by a predetermined shape engagement allowing easy removal, maintenance, and/or replacement of individual castors of the cargo dolly.

The predetermined shape engagement can provide a first predetermined shape on the cargo dolly and a second corresponding predetermined shape on the castor allowing engagement between the two without bolts, tools, and/or other fixation elements. In at least one example, the first predetermined shape and the second corresponding predetermined shape can provide "drop-in" coupling between the cargo dolly and each of the plurality of castors. In other examples, the first predetermined shape and the second corresponding predetermined shaped can include sliding and/or rotation for additional securement.

The present disclosure is shown with respect a cargo dolly for use with enclosed cargo containers; however, the presented disclosure can be implemented with any cargo dolly and used in any application requirement movement of cargo.

FIG. 1 illustrates a bottom isometric view of a cargo dolly according to at least one example of the present disclosure. The cargo dolly 10 can have a frame supporting a cargo surface 202 (shown more clearly in FIGS. 5-8), a tow bar and/or tongue 11 disposed on a front portion and/or a hitch assembly 12 disposed on a rear portion. While the present disclosure details a tow bar and/or tongue 11 on the front portion and a hitch assembly 12 on the rear portion, it is within the scope of this disclosure to include a tow bar and/or tongue on the front portion and/or rear portion and/or include a hitch assembly on the front portion and/or rear portion.

The cargo dolly 10 can have a front axle 13 and a rear axle 14 pivotally coupled thereto and further coupled together by a synchronous steering system 17. In at least one example, the front axle 13 and the rear axle 14 are coupled to a frame of the cargo dolly 10. The synchronous steering system 17 can include two or more push-pull rods 15 coupled together by an intermediate link 16. The intermediate link 16 can be pivotally coupled with the cargo dolly 10 to cause counter phase synchronous steering between the front axle 13 and the rear axle 14. The push-pull rods 15 of the respective front axle 13 and rear axle 14 can be coupled to opposing distal ends 22, 24 (shown in FIG. 2) of the intermediate link 16. The coupling of the push-pull rods 15 to opposing distal ends of the intermediate link can provide counter phase steering control. Counter phase steering can be defined such that when the pivoting of one axle (e.g. front axle) in a first direction (e.g. clockwise) causes the other axle (e.g. rear axle) to pivot a second, opposite direction (e.g. counter-clockwise).

The intermediate link 16 can include a flange 18 disposed at each distal end of the intermediate link and coupled to a respective push-pull rod 15 of the front axle 13 and/or rear axle 14. The flange 18 can include a plurality of apertures formed therein to couple with the push-pull rod 15 of a respective axle. As detailed further in FIGS. 2-4, the plurality of apertures 19 can provide differing proportions of steering with respect to the cargo dolly 10. In at least one example, the cargo dolly 10 is coupled to additional cargo dollies (not shown) via the tow bar, tongue, and/or hitch assembly to form a train of cargo dollies in which the intermediate link 16 and the plurality of apertures 19 can be adjusted to insure adjacent carts track within the same footprint and/or path of the preceding cargo dolly 10.

The front axle 13 and/or the rear axle 14 can be coupled with one or more wheel assemblies at each distal end. In at least one instance, as detailed in FIG. 1, the front axle 13 and the rear axle 14 are coupled with a single wheel assembly disposed at each distal end. In other instances, the front axle 13 and/or the rear axle 14 can be coupled with two wheel assemblies (e.g. dually) at each distal end.

Figure 2:
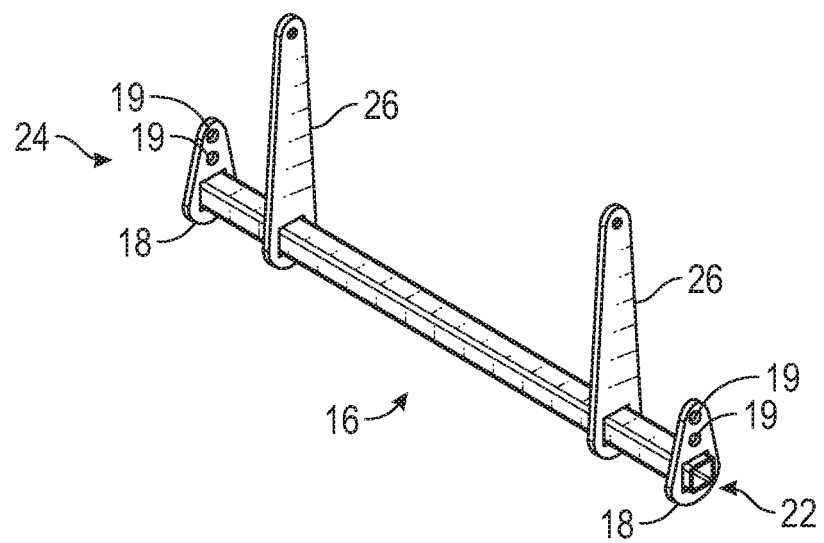
FIG. 2 is an isometric view of an intermediate link according to at least one example of the present disclosure.
Figure 3:
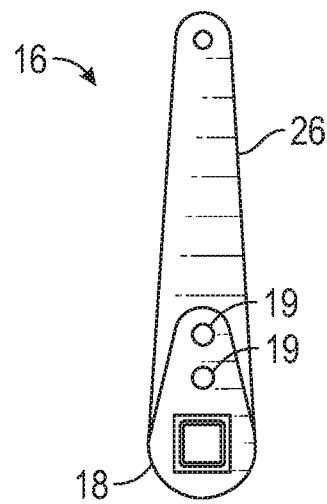
FIG. 3 is a perspective distal end view of an intermediate link according to at least one example of the present disclosure.
Figure 4:
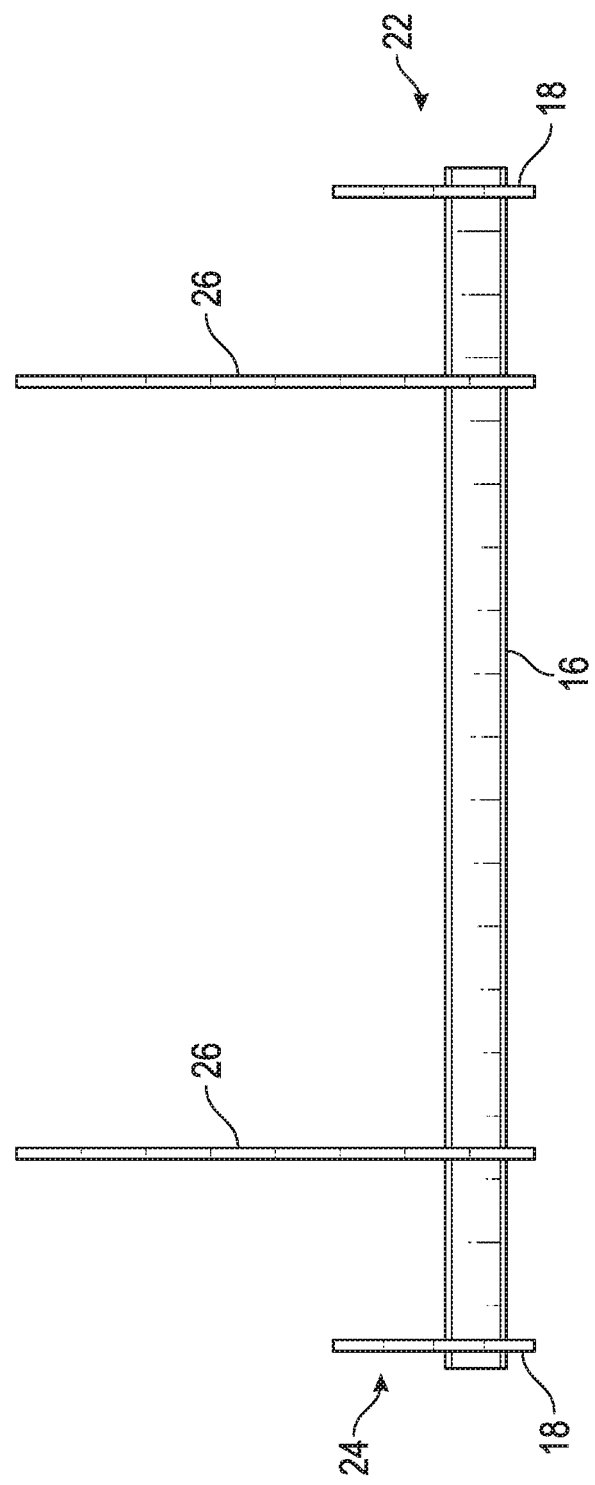
FIG. 4 is a perspective lateral view of an intermediate link according to at least one example of the present disclosure.

FIG. 2 is an isometric view of an intermediate link according to at least one example of the present disclosure. FIG. 3 is a side view of a distal end of an intermediate link according to at least one example of the present disclosure. FIG. 4 is a longitudinal view of an intermediate link according to at least one example of the present disclosure. The intermediate link 16 can be a longitudinally extending member having opposing distal ends 22, 24. Each distal end 22, 24 can be coupled, respectively, with a push-pull rod 15 of a corresponding axle via at least one of the plurality of apertures 19 formed in the flange 18. The flange 18 disposed at each distal end 22, 24 can have any number of apertures 19 formed therein including, but not limited to, two, three, four, five, or six. Each of the plurality of apertures 19 can adjust the proportion of steering when coupled with the push-pull rod 15 of the respective front axle 13 and/or rear axle 14 of the cargo dolly 10. Adjustment of the steering proportion can improve performance of a cargo dolly 10 in tight spaces and/or improve performance of a cargo dolly train (e.g. a plurality of cargo dollies 10 coupled one to the other) in tracking successively in the same footprint and/or path.

The intermediate link 16 can be pivotally coupled with the cargo dolly 10 via a cross steering link 26. The intermediate link 16 can pivot as steering input of the front axle 13 and/or rear axle 14 is transferred to the opposing front axle 13 and/or rear axle 14 via the synchronous steering system 17.

Figure 5:
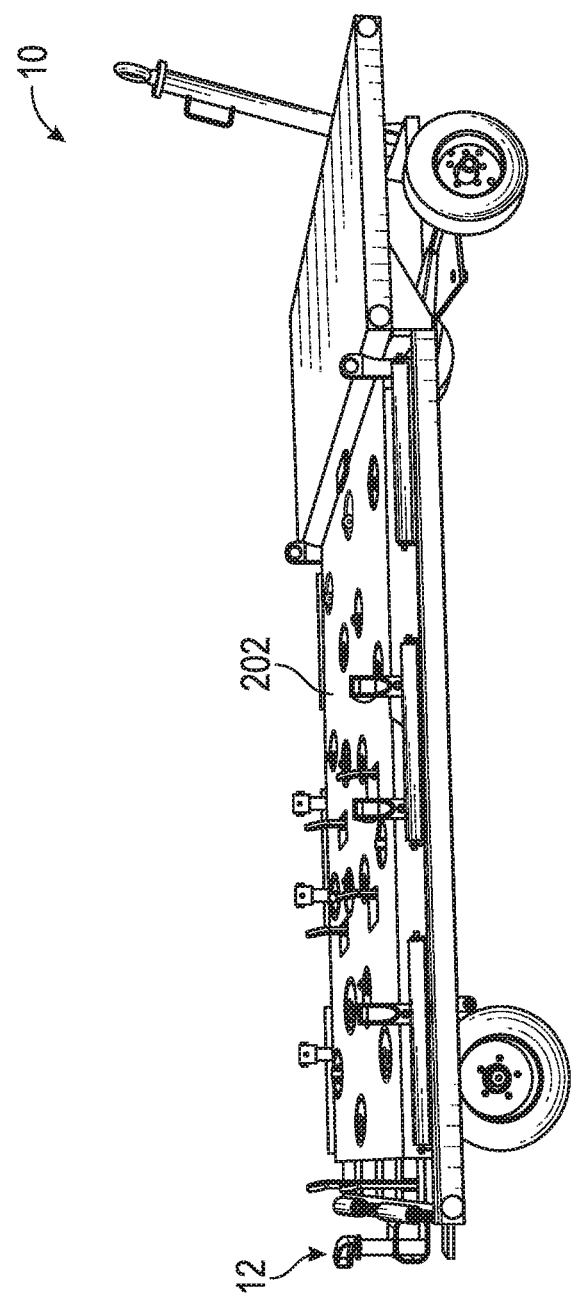
FIG. 5 is isometric view of a decoupled cargo dolly and cargo dolly expansion piece according to at least one example of the present disclosure.
Figure 5:
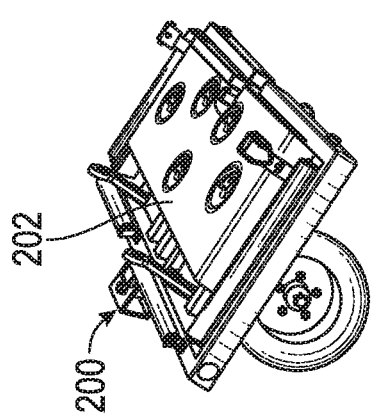
Figure 6:
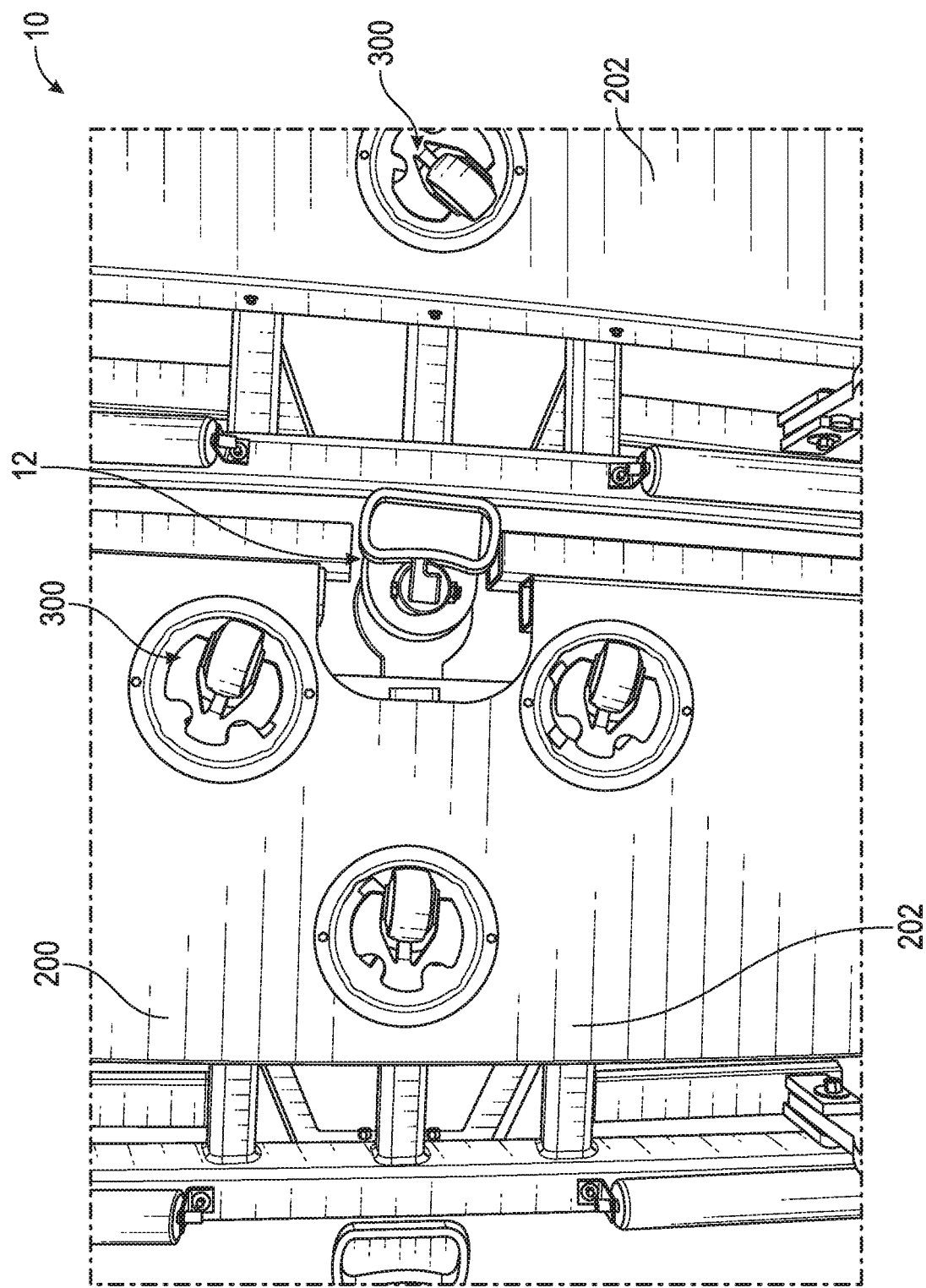
FIG. 6 is a detailed view of a coupling between a cargo dolly and a cargo dolly expansion pieces according to at least one example of the present disclosure.
Figure 7:
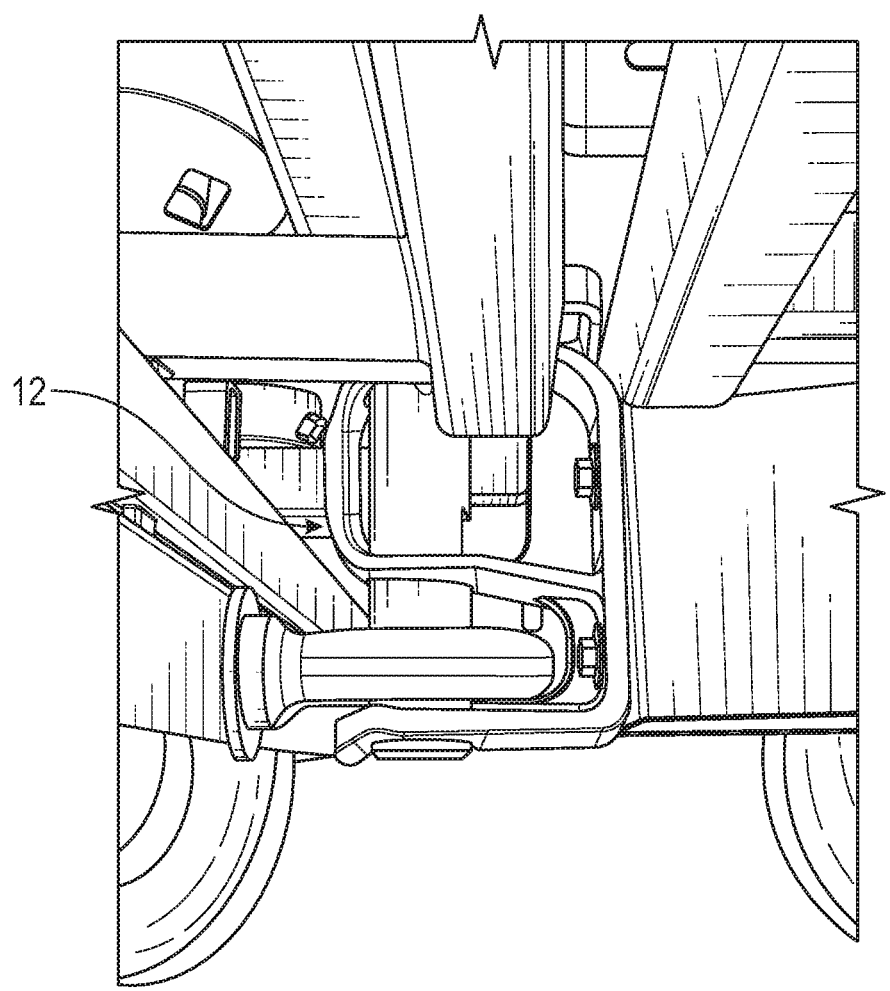
FIG. 7 is a detailed view of a pin hitch assembly according to at least one example of the present disclosure.
Figure 8:
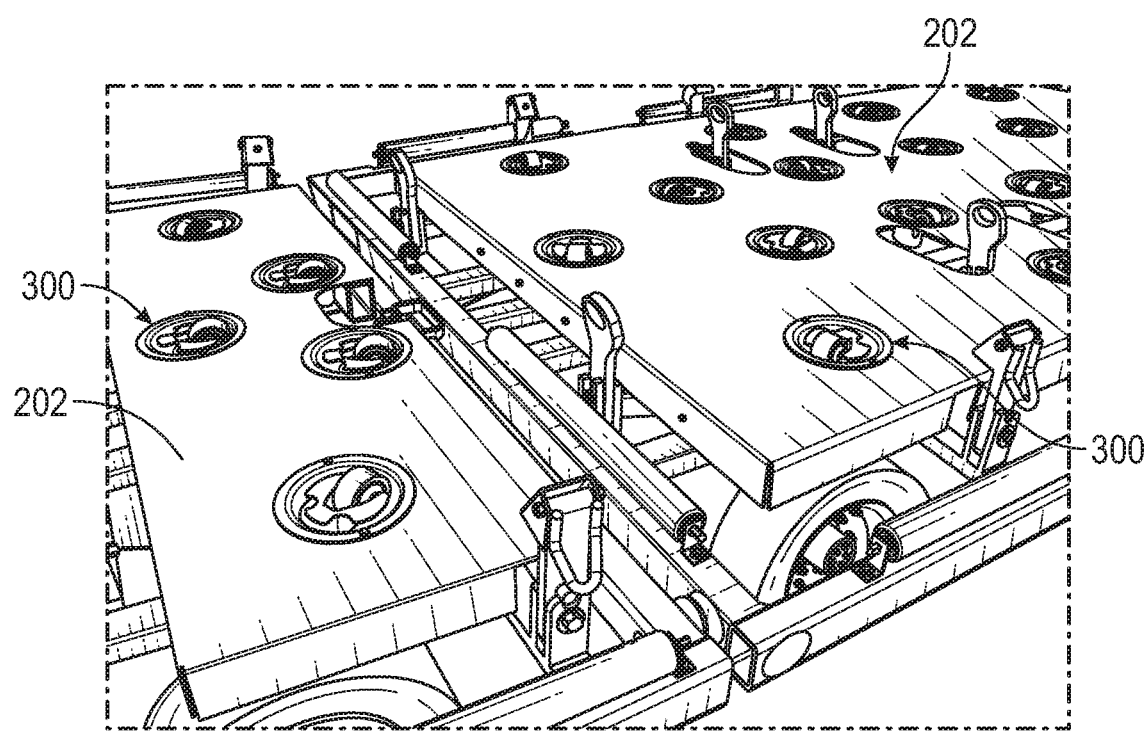
FIG. 8 is a top isometric view of a cargo dolly coupled with a cargo dolly expansion piece.

FIG. 5 is a decoupled view of a cargo dolly and a cargo dolly expansion piece according to at least one example of the present disclosure. FIG. 6 is a top view of a cargo dolly coupled with a cargo dolly expansion piece according to at least one example of the present disclosure. FIG. 7 is a detailed view of a hitch coupling between a cargo dolly and a cargo dolly expansion piece according to at least one example of the present disclosure. FIG. 8 is a top isometric view of a cargo dolly expansion piece coupled with a cargo dolly according to at least one example of the present disclosure. A cargo dolly 10 can be coupled with a cargo dolly expansion piece 200 to expand the cargo capacity of the cargo dolly 10 without requiring additional cargo dollies 10. The cargo dolly expansion piece 200 can provide modular expansion of the cargo dolly 10. The cargo dolly expansion piece 200 can include a hitch assembly 12 on the front portion and/or rear portion to assist in coupling with a cargo dolly 10 and allowing coupling to additional cargo dollies in event of a cargo dolly train.

The cargo dolly expansion piece 200 can be a single axle, modular expansion piece to provide a substantially continuous cargo surface 202 with the adjacent cargo dolly 10. The cargo dolly expansion piece 200 can allow carrying of additional and/or larger cargo without the need for additional cargo dollies 10. The hitch assembly 12 can allow the counter phase synchronous steering system 17 to drive and/or direct the cargo dolly expansion piece.

While the present disclosure details one cargo dolly expansion piece 200 coupled with a cargo dolly 10, it is within the scope of this disclosure to modularly implement any number of cargo dolly expansion pieces 200 with a single cargo dolly 10 depending on the cargo to be carried and/or the size of the cargo dolly 10 and/or the cargo dolly expansion piece 200. In at least one example, a cargo dolly 10 can be coupled sequentially with two cargo dolly expansion pieces 200 with the second cargo dolly expansion piece 200 coupled to the first cargo dolly expansion piece.

As detailed in FIGS. 6 and 8, the cargo surface 202 of the cargo dolly 10 and the cargo dolly expansion piece 200 can include a plurality of castors 300. The plurality of castors 300 can project just above the cargo surface 202 to assist in loading, positioning, and/or unloading of cargo from the cargo dolly 10.

The plurality of castors 300 can be coupled with the cargo dolly 10 and/or the cargo dolly expansion piece 200 by shape-fit. The shape-fit can be include a first predetermined shape formed on a coupling surface of the castor 300 and a second corresponding predetermined shape formed on a coupling surface of the cargo dolly 10. The second corresponding predetermined shape can be operable to receive the first predetermined shape of the castor 300, thereby securely coupling the castor 300 to the cargo dolly 10 and/or the cargo dolly expansion piece 200. The shape-fit coupling can further include a slide or rotational coupling to secure the castor 300 to the cargo dolly and/or the cargo dolly expansion piece 200. In at least one example, the first predetermined shape can be an irregular shape have one or more distinctive features operable to be received by the second corresponding predetermined shape in a single position. In other examples, the first predetermined shape can be substantially symmetrical and operable to be received by the second corresponding predetermined shape in more than one position. In at least one example, each of the plurality of castors 300 can be "drop-in" installation, in which a caster can be vertically installed and uninstalled through the cargo surface 202 without tools and/or access to an undercarriage (e.g. frame) of the cargo dolly 10.

The shape-fit coupling between the cargo dolly 10 and/or the cargo dolly expansion pieces 200 and the plurality of castors can assist in tool-free maintenance, replacement, and/or repair of the plurality of castors 300. The tool-free maintenance can improve reliability of the cargo dolly 10 and/or the cargo dolly expansion piece while increasing productivity.

Regarding manufacture of the cargo dolly 10, steps are provided as follows, and exemplified with the cargo dolly 10, but are equally applicable to additional ones of the cargo dolly 10, as would become apparent to one of ordinary skill in the art through the description provided herein.

The cargo dolly 10 is manufactured by pivotally coupling two axles with a frame. Each of the two axles includes a first set of distal ends and a wheel assembly coupled at each of the first set of distal ends. Next, an intermediate link is pivotally coupled with the frame. The intermediate link includes a second set of distal ends. Next a first push-pull rod is used to couple one of the two axles with the intermediate link. Next, a second push-pull rod is used to couple another one of the two axles with the intermediate link. The first push-pull rod is coupled to one of the second set of distal ends. The second push-pull rod is coupled to another one of the second set of distal ends. In this manner, the first push-pull rod, the second push-pull rod, and the intermediate link advantageously provide counter phase synchronous pivoting of the two axles relative to the transportation dolly as previously discussed in further detail herein.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

Statement of the Claims

Statement 1: A transportation dolly comprising: a frame; two axles pivotally coupled with the frame, each axle having two distal ends and a wheel assembly coupled at each distal end; an intermediate link pivotally coupled with the frame, the intermediate link having a two distal ends; and a first push-pull rod coupling one of the two axles with the intermediate link, and a second push-pull rod coupling the other of the two axles with the intermediate link, wherein the first push-pull rod is coupled to one distal end of the intermediate link and the second push-pull rod is coupled to the opposing distal end of the intermediate link, wherein the first push-pull rod, the second push-pull rod, and the intermediate link provide counter phase synchronous pivoting of the two axles relative to the transportation dolly.

Statement 2: The transportation dolly of Statement 1, wherein the intermediate link has a flange disposed at each distal end and the flange has a plurality of apertures formed therein.

Statement 3: The transportation dolly of Statement 1 or Statement 2, wherein the first push-pull rod and the second push-pull rod are optionally coupled with any one of the plurality of apertures formed in each respective flange.

Statement 4: The transportation dolly of any one of Statements 1-3, further comprising a tow bar coupled with the frame.

Statement 5: The transportation dolly of any one of Statements 1-4, further comprising a hitch coupled with the frame.

Statement 6: The transportation dolly of any one of Statements 1-5, wherein the hitch is couplable with an expansion dolly.

Statement 7: The transportation dolly of any one of Statements 1-6, wherein the expansion dolly has a fixed, non-pivotal axle.

Statement 8: The transportation dolly of any one of Statements 1-7, wherein the frame includes a cargo surface having a plurality of castors coupled thereto.

Statement 9: The transportation dolly of any one of Statements 1-8, wherein the plurality of castors are coupled via a shape-fit.

Statement 10: The transportation dolly of any one of Statements 1-9, wherein the shape-fit includes a first predetermined shape formed on each of the plurality of castors and a second predetermined shape formed on the cargo surface.

Statement 11: The transportation dolly of any one of Statements 1-10, wherein the shape-fit includes sliding and/or rotation of the plurality of castors.

Statement 12: A transportation dolly comprising: a frame; a first axle pivotally coupled with the frame, the first axle having a wheel assembly coupled at each distal end thereof; a second axle pivotally coupled with the frame, the second axle having a wheel assembly coupled at each distal end thereof; an intermediate link pivotally coupled with the frame, the intermediate link having a two distal ends; and a first push-pull rod coupling the first axle with the intermediate link at one distal end of the intermediate link, and a second push-pull rod coupling the second axle with the intermediate link at the other distal end of the intermediate link, wherein the first push-pull rod, the second push-pull rod, and the intermediate link provide counter phase synchronous pivoting of the two axles relative to the transportation dolly.

Statement 13: The transportation dolly of Statement 12, wherein the intermediate link has a flange disposed at each distal end and the flange has a plurality of apertures formed therein.

Statement 14: The transportation dolly of Statement 12 or Statement 13, wherein the first push-pull rod and the second push-pull rod are optionally coupled with any one of the plurality of apertures formed in each respective flange.

Statement 15: The transportation dolly of any one of Statements 12-14, further comprising a tow bar coupled with the frame.

Statement 16: The transportation dolly of any one of Statements 12-15, further comprising a hitch coupled with the frame wherein the hitch is couplable with an expansion dolly.

Statement 17: The transportation dolly of any one of Statements 12-16, wherein the expansion dolly has a fixed, non-pivotal axle.

Statement 18: The transportation dolly of any one of Statements 12-17, wherein the frame includes a cargo surface having a plurality of castors coupled thereto.

Statement 19: The transportation dolly of any one of Statements 12-18, wherein the plurality of castors are coupled via a shape-fit.

Statement 20: The transportation dolly of any one of Statements 12-19, wherein the shape-fit includes a first predetermined shape formed on each of the plurality of castors and a second predetermined shape formed on the cargo surface.

Statement 21: A method of manufacturing a transportation dolly, the method comprising: pivotally coupling two axles with a frame, each of the two axles having a first set of distal ends and a wheel assembly coupled at each of the first set of distal ends; pivotally coupling an intermediate link with the frame, the intermediate link having a second set of distal ends; coupling, via a first push-pull rod, one of the two axles with the intermediate link; and coupling, via a second push-pull rod, another one of the two axles with the intermediate link, wherein, the first push-pull rod is coupled to one of the second set of distal ends, the second push-pull rod is coupled to another one of the second set of distal ends, and/or the first push-pull rod, the second push-pull rod, and the intermediate link provide counter phase synchronous pivoting of the two axles relative to the transportation dolly.

Statement 22: the method of Statement 21: wherein the intermediate link has a flange disposed at each distal end and the flange has a plurality of apertures formed therein.

Statement 23: the method of any one of Statement 21-22: wherein the first push-pull rod and the second push-pull rod are optionally coupled with any one of the plurality of apertures formed in each respective flange.

Statement 24: the method of any one of Statement 21-23: further comprising: coupling a tow bar with the frame.

Statement 25: the method of any one of Statement 21-24: further comprising: coupling a hitch with the frame, the hitch is couplable with an expansion dolly.

Statement 26: the method of any one of Statement 21-25: wherein the expansion dolly has a fixed, non-pivotal axle.

Statement 27: the method of any one of Statement 21-26: wherein the frame includes a cargo surface having a plurality of castors coupled thereto.

Statement 28: the method of any one of Statement 21-27: wherein the plurality of castors are coupled via a shape-fit.

Statement 29: the method of any one of Statement 21-28: wherein the shape-fit includes a first predetermined shape formed on each of the plurality of castors and a second predetermined shape formed on the cargo surface.

What is claimed is:

1. A transportation dolly comprising:
a frame with front and rear sides extending in a lateral direction and side edges extending between the front and rear sides in a longitudinal direction;
two axles pivotally coupled with the frame, each of the two axles having a first set of distal ends and a wheel assembly coupled at each of the first set of distal ends;
an intermediate link pivotally coupled with the frame, the intermediate link extending in the lateral direction and having a second set of distal ends;
a first push-pull rod coupling one of the two axles with the intermediate link and extending in the longitudinal direction; and
a second push-pull rod coupling another one of the two axles with the intermediate link and extending in the longitudinal direction,
wherein,
the first push-pull rod is coupled to one of the second set of distal ends,
the second push-pull rod is coupled to another one of the second set of distal ends, and
the first push-pull rod, the second push-pull rod, and the intermediate link provide counter phase synchronous pivoting of the two axles relative to the transportation dolly.

2. The transportation dolly of claim 1, wherein the intermediate link has a flange disposed at each distal end and the flange has a plurality of apertures formed therein.

3. The transportation dolly of claim 2, wherein the first push-pull rod and the second push-pull rod are optionally coupled with any one of the plurality of apertures formed in each respective flange.

4. The transportation dolly of claim 1, further comprising: a tow bar coupled with the frame.

5. The transportation dolly of claim 1, further comprising: a hitch coupled with the frame.

6. The transportation dolly of claim 5, wherein the hitch is couplable with an expansion dolly.

7. The transportation dolly of claim 6, wherein the expansion dolly has a fixed, non-pivotal axle.

8. The transportation dolly of claim 1, wherein the frame includes a cargo surface having a plurality of castors coupled thereto.

9. The transportation dolly of claim 8, wherein the plurality of castors are coupled via a shape-fit.

10. The transportation dolly of claim 9, wherein the shape-fit includes a first predetermined shape formed on each of the plurality of castors and a second predetermined shape formed on the cargo surface.

11. The transportation dolly of claim 9, wherein the shape-fit includes sliding and/or rotation of the plurality of castors.

12. A method of manufacturing a transportation dolly, the method comprising:
pivotally coupling two axles with a frame, each of the two axles having a first set of distal ends and a wheel assembly coupled at each of the first set of distal ends, the frame having front and rear sides extending in a lateral direction and side edges extending between the front and rear sides in a longitudinal direction;
pivotally coupling an intermediate link with the frame, the intermediate link extending in the lateral direction and having a second set of distal ends;
coupling, via a first push-pull rod, one of the two axles with the intermediate link, the first push-pull rod extending in the longitudinal direction; and
coupling, via a second push-pull rod, another one of the two axles with the intermediate link, the second push-pull rod extending in the longitudinal direction,
wherein,
the first push-pull rod is coupled to one of the second set of distal ends,
the second push-pull rod is coupled to another one of the second set of distal ends, and the first push-pull rod, the second push-pull rod, and the intermediate link provide counter phase synchronous pivoting of the two axles relative to the transportation dolly.

13. The method of claim 12, wherein the intermediate link has a flange disposed at each distal end and the flange has a plurality of apertures formed therein.

14. The method of claim 13, wherein the first push-pull rod and the second push-pull rod are optionally coupled with any one of the plurality of apertures formed in each respective flange.

15. The method of claim 12, further comprising:
coupling a tow bar with the frame.

16. The method of claim 12, further comprising:
coupling a hitch with the frame, the hitch is couplable with an expansion dolly.

17. The method of claim 16, wherein the expansion dolly has a fixed, non-pivotal axle.

18. The method of claim 12, wherein the frame includes a cargo surface having a plurality of castors coupled thereto.

19. The method of claim 18, wherein the plurality of castors are coupled via a shape-fit.

20. The method of claim 19, wherein the shape-fit includes a first predetermined shape formed on each of the plurality of castors and a second predetermined shape formed on the cargo surface.

\* \* \* \* \*